United States Patent [19]
Scott

[11] Patent Number: 5,975,176
[45] Date of Patent: Nov. 2, 1999

[54] TIRE HAVING A CONSTANTLY DECREASING DIAMETER

[76] Inventor: John R. Scott, 32182 W. Oakland Rd., Nashotah, Wis. 53058

[21] Appl. No.: 09/087,762

[22] Filed: May 29, 1998

[51] Int. Cl.$^6$ .............................. B60C 3/06; B60C 11/00; B60C 13/00
[52] U.S. Cl. ...................... 152/456; 152/209.8; 152/454; 152/455; 152/DIG. 6; 280/86.751
[58] Field of Search ...................................... 152/456, 455, 152/DIG. 6, 454, 209.8; 280/86.751, 86.752, 86.753, FOR 112; 180/21; 244/103 R, 104 R, 104 FP

[56] References Cited

U.S. PATENT DOCUMENTS 3,435,874  4/1969  Mirtain et al. .
3,765,468  10/1973  Verdier ................................. 152/455 X
4,840,210  6/1989  Kukimoto .
4,848,429  7/1989  Mezzanotte .
5,620,538  4/1997  Oshima .

*Primary Examiner*—Adrienne C. Johnstone
*Attorney, Agent, or Firm*—Donald J. Ersler

[57] ABSTRACT

A tire having a decreasing profile diameter includes an outside sidewall with a greater height than the inside sidewall. The inner diameters of each sidewall are preferably identical. The outer diameter of the outside sidewall is greater than the outer diameter of the inside sidewall. The cross-section of the width of the tread has a substantially constant thickness from the inside tread diameter to the tread surface of the tire. The depth of the tread is preferably constant across the width of the tread surface.

7 Claims, 3 Drawing Sheets

TIRE HAVING A CONSTANTLY DECREASING DIAMETER

BACKGROUND OF THE INVENTION

1. Field of the Invention

The present invention relates generally to tires and more specifically to a tire having a decreasing profile diameter which has an outside sidewall with a greater height than the inside sidewall to provide increased vehicle performance.

2. Discussion of the Prior Art

There have been numerous attempts at optimizing the handling and braking performance of tires through the variation of tread designs and profiles. One method of modifying the profile of a tire is to decrease the outer diameter of the tire from one sidewall to an opposite sidewall. Some examples of this tire profile modification can be found in U.S. Pat. No. 3,435,874 to Mirtain et al., U.S. Pat. No. 4,840,210 to Kukimoto, and U.S. Pat. No. 4,848,429 to Mezzanotte. Each of these patents disclose a tapered or sloping tire profile. However, none of these patents disclose a tire profile which has a substantially constant cross-sectional thickness across the width of the tread surface. Some of these patents also disclose a thread depth which is non-constant.

Accordingly, there is a clearly felt need in the art for a tire having a decreasing profile diameter which has a substantially constant cross-sectional thickness across the width of the tread surface, and a substantially constant tread depth.

SUMMARY OF THE INVENTION

The primary objective of the present invention is to provide a tire having a decreasing profile diameter which has a substantially constant cross-sectional thickness across the width of the tread surface, and a substantially constant tread depth.

According to the present invention, a tire having a decreasing profile diameter includes an outside sidewall which has a greater height than the inside sidewall. The inner diameters of each sidewall are preferably identical. The outer diameter of the outside wall is greater than the outer diameter of the inside sidewall. The cross-section of the width of the tread has a substantially constant thickness from the inside tread diameter to the tread surface of the tire. The depth of the tread is preferably substantially constant across the width of the tread surface. The decreasing profile is preferably flat as opposed to a crown shape. Yet, a crown may still be formed at substantially the middle of the tread surface if warranted by a particular application.

Accordingly, it is an object of the present invention to provide a tire having a decreasing profile diameter which improves handling of a vehicle, because of the tire's increased contact patch with a road surface.

It is a further object of the present invention to provide a tire having a decreasing profile diameter which improves braking of a vehicle, because of the tire's increased contact patch with a road surface.

It is yet a further object of the present invention to provide a tire having a decreasing profile diameter which allows more extreme negative camber adjustments to be made to the wheel than that of normal tires.

It is yet a further object of the present invention to provide a tire having a decreasing profile diameter which widens the track of vehicle.

It is yet a further object of the present invention to provide a tire having a decreasing profile diameter which allows a wider tire to fit in a wheel well.

Finally, it is another object of the present invention to provide a tire having a decreasing profile diameter which provides for more consistent temperatures across the width of the tread surface when the temperature of the tire increases.

These and additional objects, advantages, features and benefits of the present invention will become apparent from the following specification.

DETAILED DESCRIPTION OF THE PREFERRED EMBODIMENTS

Figure 1:
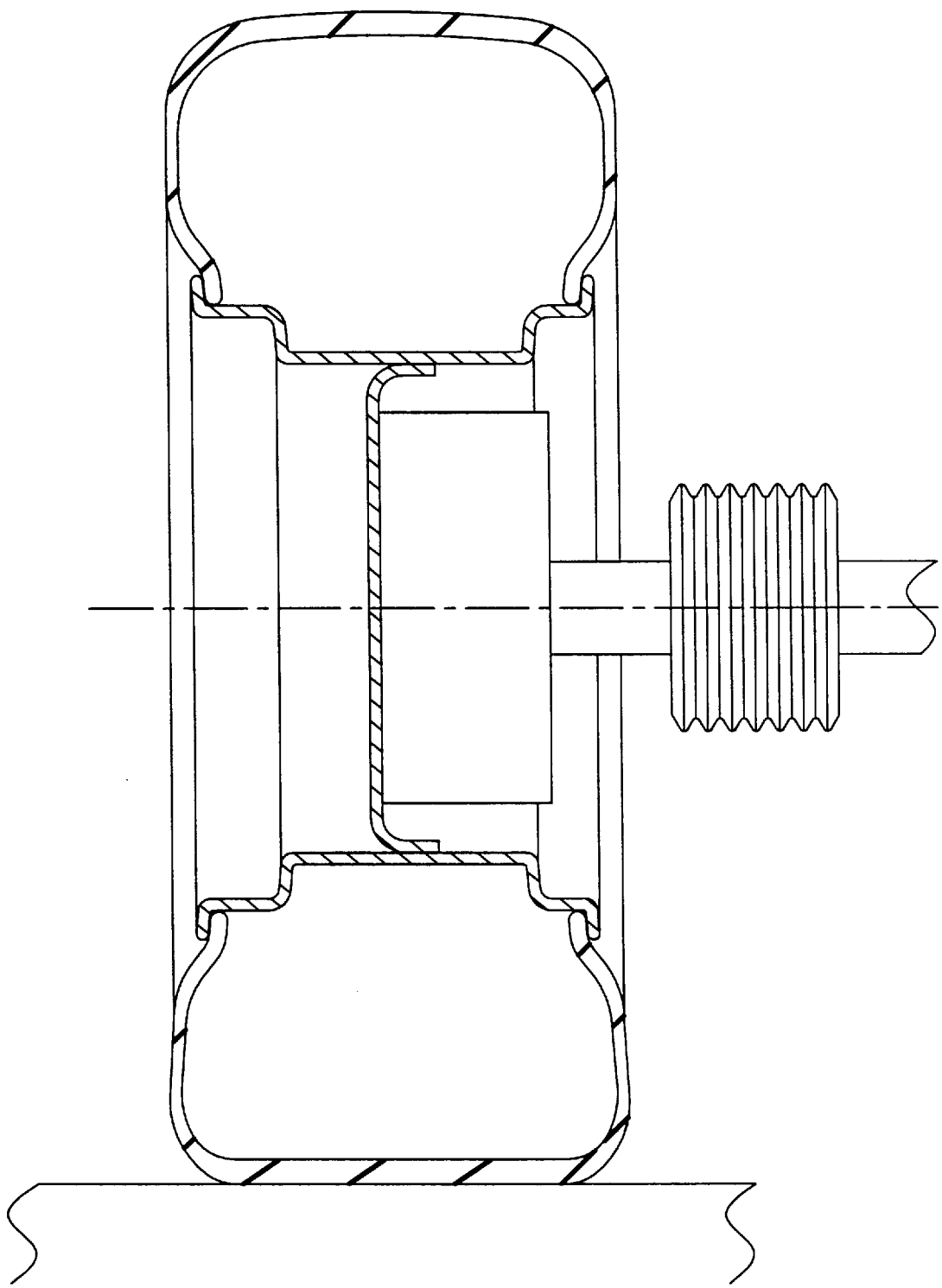
FIG. 1 is a cross-sectional view of a standard tire design mounted on a rim and in contact with a road surface.
Figure 2:
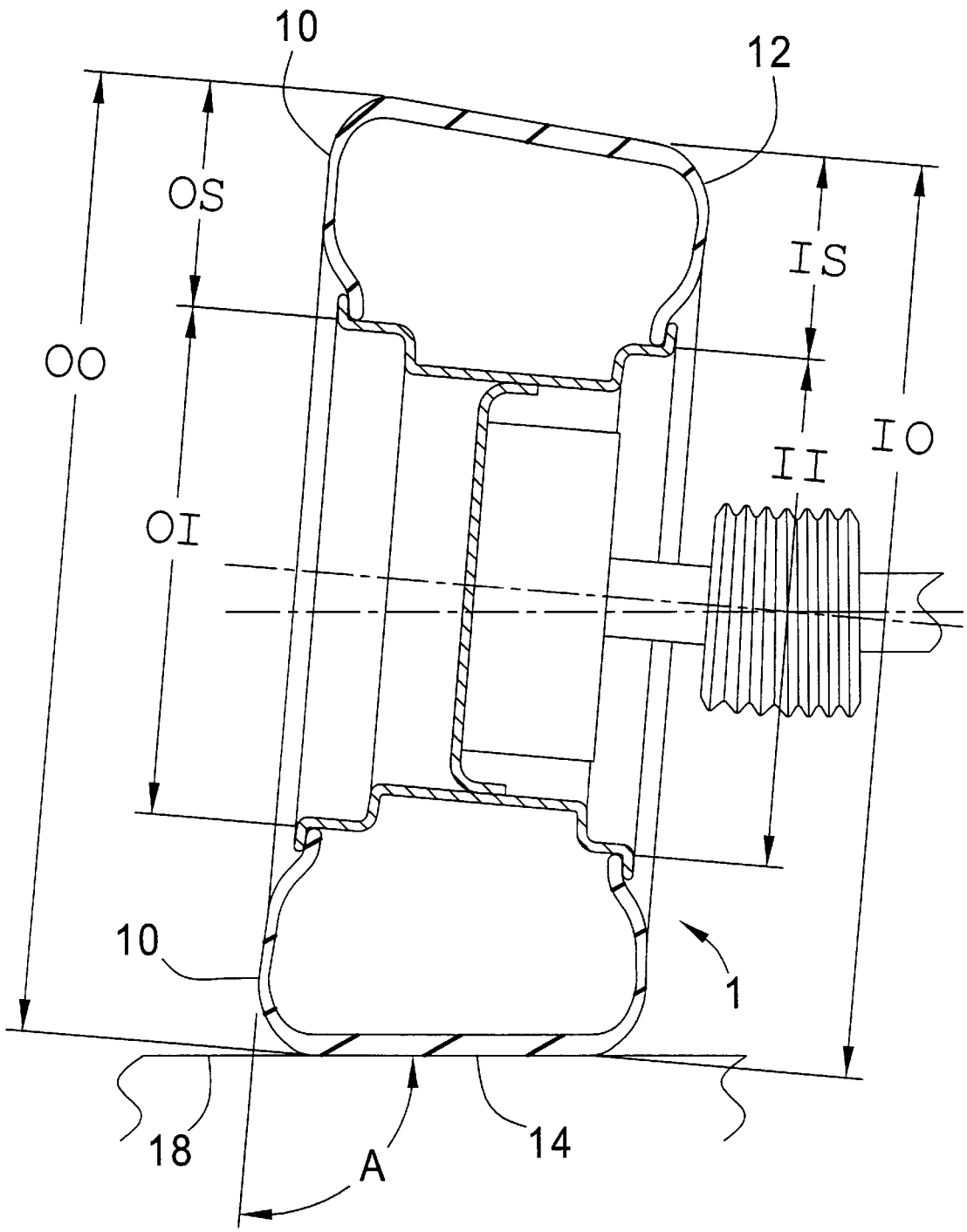
FIG. 2 is a cross-sectional view of a tire having a decreasing profile diameter mounted on a rim and in contact with a road surface in accordance with the present invention.

With reference now to the drawings, and particularly to FIG. 2, there is shown a cross-sectional view of a tire having a decreasing profile diameter 1. FIG. 1 shows a standard tire design. Only a small amount of negative camber is allowed for optimal handling performance without prematurely wearing out the tread near the inside wall of the tire. The tire having a decreasing profile diameter 1 includes an outside sidewall 10 which is greater in height than the inside diameter sidewall 12. The outside sidewall inner diameter "OI" is preferably equal to inside sidewall inner diameter "II." It would also be possible to fabricate the tire having a decreasing profile diameter 1 for a rim that has an outside sidewall inner diameter which is different than the inside sidewall inner diameter, while maintaining nearly the same performance characteristics. Preferably, the distance "OS" from the inner diameter "OI" to the outer diameter "OO" of the outside sidewall 10 is greater than the distance "IS" from the inner diameter "II" to the outer diameter "IO" of the inside sidewall 12. However, outer diameter "OO" is greater than outer diameter "OI" whether inner diameter "OI" is equal to inner diameter "II" or not. It is preferable that angle A between the outside sidewall 10 and the tread surface 14 be 90.1 degrees or greater.

Figure 3:
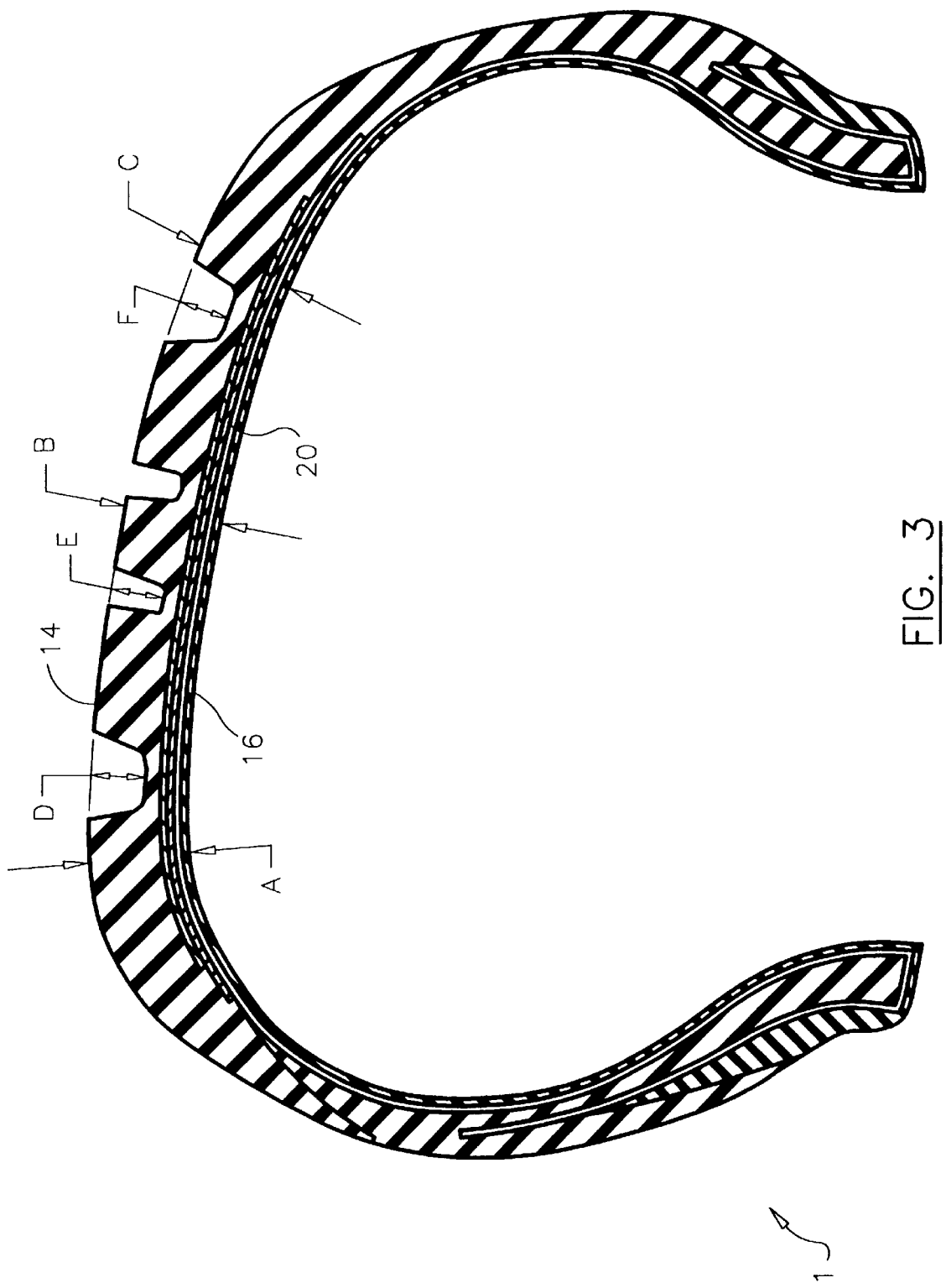
FIG. 3 is an enlarged cross-sectional view of a tire having a decreasing profile diameter in accordance with the present invention.

FIG. 3 shows an enlarged cross-sectional view of a tire having a decreasing profile diameter 1. It is preferable that the cross-section of the tread have a substantially constant distance from the inside tread diameter 16 of the tire to the tread surface 14. Dimensions A, B, and C are preferable equivalent to each other. Tread depth is also preferably substantially constant. Dimensions D, E, and F are preferable equivalent to each other. The decreasing profile of the tread surface 14 is preferably flat as opposed to a crown shape of many prior art tire designs. The flat shape will provide an improved contact patch with a road surface. It is preferable that the belts 20 are substantially parallel to the tread surface 14 to enhance the performance characteristics previously mentioned.

The substantially constant distance from the inside tread diameter 16 to the tread surface 14 would be alter if a crown were formed in substantially the middle of the tread surface 14. The distance between the inside tread diameter 16 and the tread surface 14 would be least at the edges of the tread surface 14 and would be greatest at substantially the middle of the tread surface 14.

It is preferable that the outside sidewall 10 be stiffer than the inside sidewall 12 of the tire having a decreasing profile diameter 1. The outside sidewall 10 can be made stiffer than the inside sidewall 12 by adding at least one extra belt or bias ply to the outside sidewall. The stiffer outside sidewall 10 can improve cornering performance.

The belt and internal construction of the tire having a decreasing profile diameter 1 is preferably that of prior art tires, such as radial belt and bias ply constructions. Also, the material which the belts are constructed from should include steel, aramid, nylon, and kevlar. The tire having a decreasing profile diameter 1 may be fabricated from state of the art rubber compositions being presently used in tire construction such as natural rubber, and synthetic rubber. The tread pattern can also be that of prior art tires. The fabrication of the tire can utilize state of the art molding processes. The tire having a decreasing profile diameter 1 is preferably of a tubeless design, but could be of a tube, or nonpneumatic design.

It is preferable that the suspension system of the vehicle be adjusted to add negative camber as shown in FIG. 2 such that the tread surface 14 is substantially parallel to the road surface 18. The tire having a decreasing profile diameter 1 is intended only for a suspension system which may be adjusted to add negative camber. The tire having a decreasing profile diameter 1 should not be used on solid axles, but can be used in front wheel applications as well as rear wheel independent suspensions where negative camber can be added or adjusted.

The tire having a decreasing profile diameter 1 has many secondary advantages which result from its unique design. Heat generated during extreme cornering is more evenly distributed across the tread surface because the tire deforms less than a normal tire during cornering. The tire having a decreasing profile diameter 1 will afford the vehicle better cornering performance, because it allows the vehicle suspension to be set at extreme angles of negative camber. Increased negative camber can improve cornering performance.

The tire having a decreasing profile diameter 1 increases the track width of the vehicle, because the tire protrudes further from the width of the vehicle than a normal tire. The tire having a decreasing profile diameter 1 allows a wider tire to be placed in a wheel well, because the top portion of the tire 1 leans into the wheel affording greater clearance or extra clearance for a wider tire. The tire having a decreasing profile diameter 1 affords greater protection to rims than that of the prior art; the tire protrudes horizontally further from the rim to protect against getting too close to a curb and scraping the rim surface.

The increased control which the tire having a decreasing profile diameter 1 provides, makes a vehicle safer to drive. The wide track helps prevent high center of gravity vehicles from tipping over. Improved cornering increases the chances of retaining control of a vehicle during a swerve maneuver. The improved braking increases the chances of stopping sooner to avoid hitting an object.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention. The invention should not be limited to racing cars or high performance cars, but should include passenger cars, vans, sport utility vehicles, busses, and semi tractor trailers.

I claim:

1. A tire having a decreasing profile diameter installed on an independent suspension of a vehicle wherein:

said tire has an outside sidewall which is greater in height than an inside sidewall;

a tread surface of said tire forms an obtuse angle with said outside sidewall, the distance between an inside tread diameter and said tread surface being substantially constant across the width of said tread surface; and said independent suspension is adjusted to have negative camber such that said tread surface is substantially parallel to a road surface.

2. The tire having a decreasing profile diameter installed on an independent suspension of a vehicle of claim 1, wherein:

a tread depth of said tire having a decreasing profile diameter is substantially constant across the width of said tread surface.

3. The tire having a decreasing profile diameter installed on an independent suspension of a vehicle of claim 1, wherein:

said outside sidewall is stiffer than said inside sidewall to improve handling of said vehicle.

4. The tire having a decreasing profile diameter installed on an independent suspension of a vehicle of claim 1, wherein:

said tire is a belted radial tire.

5. The tire having a decreasing profile diameter installed on an independent suspension of a vehicle of claim 1, wherein:

said tire is a bias ply tire.

6. A method of improving the handling performance of a vehicle, comprising the steps of:

(a) installing at least one tire having a decreasing profile diameter on an independent suspension of said vehicle, said at least one tire having an outside sidewall which is greater in height than an inside sidewall and a tread surface forming an obtuse angle with said outside sidewall, a distance between an inside tread diameter and said tread surface being substantially constant across the width of said tread surface; and (b) adding negative camber to said independent suspension such that said tire tread surface is substantially parallel to a road surface.

7. The method of improving the handling of a vehicle of claim 6, wherein:

a tread depth of said at least one tire having a decreasing profile diameter is substantially constant across the width of said tread surface.

* * * * *